United States Patent [19]

Tsubakimoto et al.

[11] Patent Number: 4,972,025
[45] Date of Patent: Nov. 20, 1990

[54] CEMENT DISPERSANT

[75] Inventors: Tsuneo Tsubakimoto, Toyonaka; Yoshinori Sano, Kobe; Hideyuki Tahara, Osaka; Tsuyoshi Hirata, Takatsuki; Hiroshi Ito, Osaka; Yasuhiro Mori, Suita, all of Japan

[73] Assignee: Nippon Shokubai Kagaku Kogyo, Co., Ltd., Osaka, Japan

[21] Appl. No.: 173,200

[22] Filed: Mar. 24, 1988

[30] Foreign Application Priority Data

Mar. 24, 1987 [JP] Japan ............................ 62-67877
May 18, 1987 [JP] Japan ............................ 62-119132

[51] Int. Cl.$^5$ ............................................ C08F 220/18
[52] U.S. Cl. ........................... 525/329.4; 525/329.6; 525/329.9; 526/312
[58] Field of Search ............... 525/329.4, 329.6, 329.9; 526/312

[56] References Cited

FOREIGN PATENT DOCUMENTS 51-15856  5/1976  Japan .
53-5691   3/1978  Japan .
53-5692   3/1978  Japan .
56-40106  9/1981  Japan .
58-26061  2/1983  Japan .
61-034008 2/1986  Japan .

*Primary Examiner*—Joseph L. Schofer
*Assistant Examiner*—Jeffrey T. Smith
*Attorney, Agent, or Firm*—Omri M. Behr

[57] ABSTRACT

A cement dispersant containing a water-soluble polymer containing at least 10 mol % of structural units represented by the general formula I:

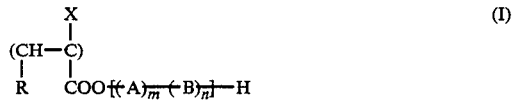

wherein X is H or $CH_2R^1$, $R^1$ is H or COO—[—A)$_m$B)$_n$]H, R is H, $CH_3$, or COO—[—A)$_m$B)$_n$]H (providing that R is H where X is $CH_2R^1$), A is iminoalkylene having 2 to 4 carbon atoms, B is oxyalkylene having 2 to 4 carbon atoms, m is an average number in the range of 0.1 to 10, n is 0 or an average positive number not more than 100, —A)$_m$ may be in a linear or branched configuration, wherein the sequence of A and B in the segment in parenthesis may be regular or random.

8 Claims, No Drawings

CEMENT DISPERSANT

BACKGROUND OF THE INVENTION

1. Field of the Invention

This invention relates to a cement dispersant capable of preventing slump loss. More particularly it relates to an agent which is incorporated in a cement composition such as cement paste, cement mortar or concrete for the purpose of heightening the flowability thereof and, at the same time, preventing the flowability from deteriorating with elapse of time (hereinafter referred to as "slump loss") thereby enhancing the workability thereof.

2. Description of the Prior Art

The cement composition such as cement paste, cement mortar or concrete is caused as by the hydration of cement with water to incur loss of consistency and decline of workability with elapse of time after the mixing of ingredients thereof. This phenomenon is generally called "slump loss".

The slump loss in the cement composition, e.g. in freshly mixed concrete, entails various hindrances such as limitation of time allowed for transportation, degeneration of quality and impairment of workability due to protracted waiting time at the site of placement, and loss of durability due to cold joint. At a factory for the manufacture of secondary products of concrete, the slump loss can cause sharp rise of hydraulic pressure for conveyance or full closure of a pump when the conveyance of cement composition is temporarily suspended during a lunch time or on account of mechanical trouble and it is restarted later on. In the case of a mold to be used for the formation of a shaped article of concrete, the slump loss can cause the problem of incomplete filling, for example, when the work for compaction is delayed by some reason or other after the placement of cement composition has been completed. The slump loss in the cement composition, therefore, constitutes itself an important problem to be solved for the control of quality and for the improvement of workability of the cement composition at plants for production of ready-mixed concrete and plants for manufacture of secondary products.

Heretofore, as measures for the prevention of slump loss, the following methods have been known to the art.

(A) A method which relies on an increase in the unit amount of water in concrete.

(B) A method which resorts to late addition of a cement dispersant.

(C) A method which resorts to piecemeal addition of a cement dispersant.

(D) A method which relies on addition of a setting retardant, optionally in combination with a cement dispersant.

The method of (A) mentioned above comprises increasing the unit amount of water with a due allowance for the slump loss estimated to develop by the time of actual placement of the cement composition. Though this method attains improvement in workability, it entails not only a disadvantage in terms of quality that the set product suffers from inferior durability because of loss of strength and formation of cracks due to dry shrinkage but also an economic disadvantage that the unit consumption of cement must be inevitably increased.

The method of (B) is meant as a measure for temporary improvement in flowability. The cement dispersant, even after it has fulfilled the purpose of retaining the slump intact, it locally remains in the cement composition and entails such adverse effects as local occurrence of bleeding and consequent loss of strength.

The method of (C) comprises repeating the addition of a cement dispersant each time the slump loss manifests itself. It is incapable of thoroughly preventing the slump loss. Moreover, it inevitably entails an operational and economic disadvantage of repeating addition.

The method of (D) is aimed at retaining the flowability intact by using a retardant such as an oxycarboxylate, a lignin sulfonate, dextrin, or humic acid either alone or in combination with a cement dispersant thereby retarding the time for setting the cement composition. This method has a large possibility of incurring such drawbacks as loss of strength and insufficient setting when the additives are used excessively.

Thus, these methods invariably have demerits of their own and do not prove to be fully practicable.

An object of this invention, therefore, is to provide a novel cement dispersant, a cement composition, and a method for dispersion of cement in the cement composition.

Another object of this invention is to provide a cement dispersant for heightening flowability of cement composition and preventing the cement composition from slump loss, a cement composition incorporating the cement dispersant, and a method for dispersion of cement in the cement composition.

SUMMARY OF THE INVENTION

The object described above are accomplished by a cement dispersant containing a water-soluble polymer containing at least 10 mol % of structural units represented by the formula I:

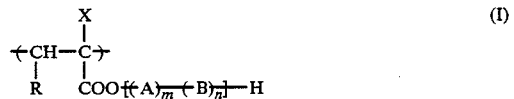

wherein X is H or $CH_2R^1$, $R^1$ is H or $COO\text{-}\{(A)_{\overline{m}}(B)_{\overline{n}}\}H$, R is H, $CH_3$, or $COO\text{-}\{(A)_{\overline{m}}(B)_{\overline{n}}\}H$ (providing that R is H where X is $CH_2R^1$), A is iminoalkylene having 2 to 4 carbon atoms, B is oxyalkylene having 2 to 4 carbon atoms, m is an average number in the range of 0.1 to 10, n is 0 or an average positive number not more than 100, $-(A)_m$ may be in a linear or branched configuration, wherein the sequence of A and B in the segment in parenthesis may be regular or random.

The object are also accomplished by a cement composition which comprises 100 parts by weight of cement, 0.01 to 10 parts by weight of a water-soluble polymer containing not less than 10 mol % of structural units represented by the formula I, and 10 to 200 parts by weight of water.

These objects are further accomplished by a method for the dispersion of cement, which method comprises mixing 100 parts by weight of cement with 0.01 to 10 parts by weight of a water-soluble polymer containing not less than 10 mol % of structural units represented by the formula I in the presence of 10 to 200 parts by weight of water.

EXPLANATION OF THE PREFERRED EMBODIMENT

The cement dispersant according to this invention contains a water-soluble polymer containing not less than 10 mol %, preferably not less 50 mol %, of structural units represented by the formula I:

$$\begin{array}{c} X \\ | \\ \text{+CH-C+} \\ | \quad | \\ R \quad \text{COO}\text{(A)}_{\overline{m}}\text{(B)}_{\overline{n}}\text{H} \end{array} \quad (I)$$

wherein X is H or $CH_2R^1$, $R^1$ is H or COO—$(A)_{\overline{m}}(B)_{\overline{n}}$H, R is H, $CH_3$, or COO—$(A)_{\overline{m}}(B)_{\overline{n}}$H (providing that R is H where X is $CH_2R^1$), A is iminoalkylene having 2 to 4, such as iminoethylene ($—CH_2—CH_2—NH—$), iminopropylene $$(-CH_2CH_2CH_2NH- \quad \text{or} \quad -CH_2-\overset{CH_3}{\underset{|}{CH}}-NH-)$$

and the like, desirably 2 or 3, and particularly desirably 2, carbon atoms, B is oxyalkylene having 2 to 4, such as oxyethylene ($—CH_2CH_2—O—$), oxypropylene ($—CH_2CH_2CH_2—O—$ or $$-CH_2\overset{CH_3}{\underset{|}{CH}}-O-)$$

and the like, desirably 2 or 3, and particularly desirably 2, carbon atoms, m is an average number in the range of 0.1 to 10, preferably 0.4 to 8, n is 0 or an average positive number of not more than 100, preferably 0 or an average positive number of not more than 20, $(A)_m$ may be in a linear or branched configuration, wherein the sequence of A and B in the segment in parenthesis may be regular or random. Preferably in the formula I, X stands for H or $CH_3$ and R for H or $CH_3$, particularly for H.

A method for the production of the water-soluble polymer (I) for use in the dispersant of the present invention is so-called high polymer method described below.

This method specifically comprises preparing (A) a carboxyl group-containing polymer by using (a) 10 to 100 mol % of at least one unsaturated carboxylic acid monomer selected from the group consisting of acrylic acid, methacrylic acid, crotonic acid, maleic acid, maleic anhydride, fumaric acid, itaconic acid, and itaconic anhydride and (b) 90 to 0 mol % of other monomer copolymerizable with the aforementioned monomer (providing that the total amount of (a) and (b) is 100 mol %) and subjecting the carboxyl group-containing polymer to addition reaction with an alkylene imine of 2 to 4 carbon atoms.

In the addition reaction of the carboxyl group-containing polymer (A) with an alkylene imine, may be used either solely or in combination with an alkylene oxide. In the case of the joint addition of two alkylene compounds, they may be simultaneously added to the carboxyl group-containing polymer (A) to take part in the addition reaction at the same time. Alternatively, these two compounds may be sequentially added; first the alkylene imine may be used in the early stage of the addition reaction and the alkylene oxide may be introduced later on to take part in the latter stage of the reaction. The latter sequential addition proves to be more advantageous over the former simultaneous addition because of the ease of control of the reaction and the quality of the produced water-soluble polymer (I) to be manifested as used in the cement dispersant.

To be used advantageously for the cement dispersant of the present invention, therefore, the water-soluble polymer (I) is preferably an aminoalkylated polymer (II) which is obtained by preparing a carboxyl group-containing polymer (A) by using (a) 10 to 100 mol %, preferably 50 to 100 mol %, of an unsaturated carboxylic acid represented by the formula II:

$$CHR^2=CYCOOH \quad (II)$$

wherein Y stands for H or $CH_2R^3$, $R^3$ for H or COOH, $R^2$ for H, $CH_3$ or COOH (providing that $R^2$ is H where Y stands for $CH_2R^3$), or an anhydride thereof (hereinafter referred to as "unsaturated carboxylic acid type monomer (a)") such as, for example, acrylic acid, methacrylic acid, crotonic acid, maleic acid, maleic anhydride, fumaric acid, itaconic acid, and itaconic anhydride and (b) 90 to 0 mol %, preferably 50 to 0 mol % of other monomer copolymerizable with the monomer (a) mentioned above (providing that the total amount of (a) and (b) is 100 mol %), causing the polymer (A) to react with an alkylene imine of 2 to 4, desirably 2 or 3, and particularly desirably 2, carbon atoms in a ratio such that the amount of the alkylene imine falls in the range of 0.1 to 10 mols, preferably 0.4 to 8 mols, per mol of the carboxyl group in the polymer (A) and/or hydroxyalkylamino alkylated polymer (III) which is obtained by further causing the polymer (II) to react with an alkylene oxide of 2 to 4, desirably 2 or 3, and particularly desirably 2, carbon atoms in a ratio such that the amount of the alkylene oxide falls below 100 mols, preferably below 20 mol, per mol of the carboxyl group in the carboxyl group-containing polymer (A).

The copolymerizable monomer (b) to be used in the present invention is other monomer which is copolymerizable with the unsaturated carboxylic acid monomer (a). As typical examples of the copolymerizable monomer (b), there can be cited monovalent metal salts, divalent metal salts, ammonium salts, and organic amine salts of such unsaturated carboxylic acids as (meth)acrylic acid, maleic acid, and fumaric acid; monoesters or diesters of such unsaturated carboxylic acids as (meth)acryic acid, maleic acid, and fumaric acid with aliphatic alcohols of 1 to 20 carbon atoms, glycols of 2 to 4 carbon atoms, polyalkylene glycols derived from such glycols and possessed of an addition mol number in the range of 2 to 100, or alkoxy(poly)alkylene glycols derived from glycols or polyalkylene glycols and aliphatic alcohols of 1 to 5 carbon atoms; alkenyl ester of acetic acid such as vinyl acetate and propenyl acetate; aromatic vinyls such as styrene, p-methylstyrene, and styrene-sulfonic acid; unsaturated sulfonic acids and salts thereof such as 2-acrylamide-2-methylpropane sulfonic acid, 2-sulfoethyl (meth)acrylate, vinylsulfonic acid, and allylsulfonic acid; (meth)acrylamides such as (meth)acrylamide, N-methyl(meth)acrylamide, N,N-dimethyl(meth)acrylamide, N-(meth)acryloyl piperidine, N-(meth)acryloyl morpholine; unsaturated hydrocarbons such as ethylene and propylene; and vinyl chloride. One member or a mixture of two or more members selected from the group of copolymerizable monomers cited above can be used herein.

The copolymerizable monomer (b) is used in an amount of not more than 90 mol % based on the total amount of the unsaturated carboxylic acid type monomer (a) and the copolymerizable monomer (b), providing that the finally produced polymer such as the aminoalkylated polymer (II) and the hydroxyalkylaminoalkylated polymer (III) is allowed to assume solubility in water. If the copolymerizable monomer (b) is used in a ratio exceeding 90 mol %, the finally produced water-soluble polymer (I) while operatibly gives rise to a degree of dispersion of cement which is not fully commercially satisfactory.

The preparation of the carboxyl group-containing polymer (A) can be effected simply by polymerizing the component monomers by the use of a polymerization initiator. This polymerization can be efficiently carried out in a solvent or in the form of bulk polymerization, for example.

The polymerization in a solvent can be performed either batchwise or continuously. As typical examples of the solvent used effectively in this polymerization, there can be cited water; lower alcohols such as methyl alcohol, ethyl alcohol, and isopropyl alcohol; aromatic or aliphatic hydrocarbons such as benzene, toluene, xylene, cyclohexane, and n-hexane; ethyl acetate; and ketones such as acetone and methylethyl ketone. From the standpoint of the solubility of the monomers as starting materials and that of the carboxyl group-containing polymer (A) consequently obtained and the convenience of handling during the reaction of the carboxyl group-containing polymer (A) with an alkylene imine, etc., it is desirable to use at least one member selected from the group consisting of water and lower alcohols of 1 to 4 carbon atoms. In the lower alcohols of 1 to 4 carbon atoms, methyl alcohol, ethyl alcohol, and isopropyl alcohol prove to be particularly desirable.

When the polymerization is to be carried out in an aqueous medium, such a water-soluble polymerization initiator as a persulfate of ammonium or an alkali metal, or hydrogen peroxide can be conveniently used. In this case, the polymerization initiator may be used in combination with a promotor such as, for example, sodium hydrogen sulfite. In the polymerization which is to be carried out in a lower alcohol, an aromatic hydrocarbon, an aliphatic hydrocarbon, ethyl acetate, or a ketone compound as a solvent, a peroxide such as benzoyl peroxide or lauroyl peroxide, hydroperoxide such as cumene hydroperoxide, or an aliphatic azo compound such as azo-bis-isobutyronitrile can be used as a polymerization initiator. In this case, the polymerization initiator may be used in combination with a promoter such as an amine compound. Where the polymerization is to be carried out in a mixture of water with a lower alcohol, a polymerization initiator selected suitably from the various examples cited above can be used either alone or in combination with a promotor. The polymerization temperature is generally in the range of 0° to 120° C., preferably 30° to 100° C., though it is variable with the particular kind of the solvent and that of the polymerization initiator to be employed.

The bulk polymerization is carried out at a temperature in the range of 50° to 150° C., preferably 50° to 120° C., in the presence of a polymerization initiator selected preferably from the group consisting of peroxides such as benzoyl peroxide and lauroyl peroxide, hydroperoxides such as cumene hydroperoxide, and aliphatic azo compounds such as azo-bis-isobutylonitrile.

The water-soluble polymer (I) which is effectively used in the cement dispersant of the present invention is obtained by causing the carboxyl group-containing polymer (A) to react with an alkylene imine of 2 to 4 carbon atoms, if desired, further reacted with an alkylene oxide of 2 to 4 carbon atoms.

In the various compounds which answer the description of alkylene imine of two to four carbon atoms for use in the present invention, ethylene imine and propylene imine prove to be particularly desirable.

In the reaction of the carboxyl group-containing polymer (A) with the alkylene imine, the alkylene imine is used in a ratio such that the amount thereof falls in the range of 0.1 to 10 mols, preferably 0.4 to 8 mols, per mol of the carboxyl group in the carboxyl group-containing polymer (A). The reaction temperature in this case is generally in the range of 0° to 120° C., preferably 10° to 100° C. This reaction proceeds smoothly even in the absence of a catalyst.

The aminoalkylated polymer (II) which is obtained by the reaction of the carboxyl group-containing polymer (A) with the alkylene imine or the polymer (III) which is obtained by the further reaction of the polymer (II) with an alkylene oxide of 2 to 4 carbon atoms can be used effectively for the cement dispersant of the present invention.

In the various compounds which answer the description of alkylene oxide to be optionally used in the present invention, ethylene oxide and propylene oxide prove to be particularly desirable.

The reaction of the aminoalkylated polymer (II) with the alkylene oxide can be carried out by any of the conventional methods which are available for the reaction of the type under discussion. Preferably, the alkylene oxide is used in a ratio such that the addition mol number thereof is within 20 times the addition mol number of the alkylene imine.

The water-soluble polymer (I) obtained as described above, such as the aminoalkylated polymer (II) and/or the polymer (III), can be used in its unmodified state as an active component for the cement dispersant. It may be neutralized, when necessary, with an alkaline substance or an acidic substance before it is used as the active component for the cement dispersant.

As typical examples of the alkaline substance, there can be cited hydroxides, oxides, and carbonates of such monovalent metals as sodium and potassium and such divalent metals as calcium, magnesium, and zinc; ammonia, and organic amines. As typical examples of the acidic substance, there can be cited monovalent and divalent organic acids and inorganic acids such as hydrochloric acid, sulfuric acid and acetic acid.

The water-soluble polymer (I) has a molecular weight in a wide range. To be used advantageously for the cement dispersant, it is desired to have a molecular weight in the range of 1,000 to 500,000, preferably 3,000 to 100,000.

The cement dispersant of this invention uses the water-soluble polymer (I) as an essential component, optionally in combination with any of the conventional cement admixtures.

As typical examples of the conventional cement admixtures, there can be cited conventional cement dispersants, air entraining agents, cement-wetting dispersants, waterproofing agents, strength enhancers, and setting promoting agents.

The cement dispersant of the present invention can be used with such hydraulic cements as portland cement, alumina cement, and various mixed cements and also for hydraulic materials such as gypsum which do not fall under category of cements.

As concerns the manner in which the cement dispersant of the present invention is used, either a method which comprises first dissolving the cement dispersant in mixing water and subsequently adding the resultant mixture to the ingredients being blended for the formation of cement composition or a method which comprises adding the cement dispersant to the cement composition already perfectly blended can be employed.

The amount of the cement dispersant of this invention to be used is in the range of 0.01 to 10%, preferably 0.1 to 1%, as solids weight, based on the amount of the cement in the cement composition. If this amount is less than 0.01%, there may ensue the possibility of the added cement dispersant manifesting no sufficient ability to prevent slump loss. Conversely, if this amount exceeds 10%, the use of the cement dispersant proves uneconomical and possibly entails drawbacks such as delayed setting of the concrete or entrainment of excessive air.

The amount of water to be used in the preparation of the cement composition is in the range of 10 to 200 parts by weight, preferably 20 to 100 parts by weight, based on 100 parts by weight of cement. Cement mortar is obtained by incorporating sand in the cement composition in an ordinary amount, i.e. an amount falling in the range of 100 to 500 parts by weight, preferably 150 to 350 parts by weight, based on 100 parts by weight of cement. Of course, the cement composition may further incorporate therein aggregates such as gravel in addition to the sand.

The cement dispersant of the present invention, as used in various cement compositions such as cement paste, cement mortar, and concrete, enables the composition to manifest high flowability without retarding their setting and prevent themselves from undergoing slump loss. Thus, it is highly effective in imparting notably improved workability to the cement compositions.

The cement dispersant of the present invention, therefore, can be used advantageously as an agent for imparting flowability to concrete mixes represented by ready-mixed concrete. Particularly, as a high-performance AE water-reducing agent of the plant-addition type, the cement dispersant easily realizes the production of ready-mixed concretes formulated for high ratio of water-reduction. Further, it can be used effectively as a high-performance water-reducing agent in the manufacture of secondary products of concrete.

Now, the cement dispersant of the present invention will be described more specifically below with reference to referential examples and working examples. It should be noted, of course, that this invention is not limited to these examples. All the percents (%) and parts mentioned hereinafter are to be construed as percents by weight and parts by weight unless otherwise specified.

Referential Example 1

In a reaction vessel provided with a thermometer, a stirrer, three dropping funnels, a gas inlet tube, and a reflux condenser, 555.4 parts of water was stirred and the air entrapped in the reaction vessel was displaced with nitrogen and the water was heated to 95° C. under an atmosphere of nitrogen. Then, a mixture containing 279.7 parts of acrylic acid, 91.3 parts of sodium acrylate, and 371 parts of water, a mixture containing 22.1 parts of ammonium persulfate and 199.2 parts of water, and a mixture containing 100.9 parts of sodium hydrogen sulfite and 235.4 parts of water were added to the contents of the reaction vessel through the dropping funnels over a period of 240 minutes. After completion of this addition, the reaction system was kept at 95° C. for 60 minutes to complete the polymerization reaction. By a test with high-speed liquid chromatography, the carboxyl group-containing polymer consequently obtained was found to possess a number average molecular weight of 2,100.

Then, the product of the polymerization reaction was cooled to a temperature of 30° C., combined with 667.8 parts of water, and heated to 40° C. To the diluted polymerization reaction product, 167 parts of ethylene imine was added over a period of 1 hour. After completion of this addition, the resultant mixture was heated to 90° C. and held at this temperature for 120 minutes to complete the addition reaction. Consequently, there was obtained an aqueous solution of an aminoethylated polymer (I).

When the aminoethylation ratio of the polymer (I) was determined by analyzing a sample for unaltered carboxyl group content by the conductrometric titration, the reaction mol number of ethylene imine per mol of the carboxyl group in the polymer (I) was found to be 0.8. The viscosity of the aqueous solution of this polymer (I) (measured with a B type viscosimeter at 25° C.) was found to be 6.1 cps.

Referential Example 2

In the same reaction vessel as used in Referential Example 1, 801.2 parts of water was stirred, the air entrapped in the reaction vessel was displaced with nitrogen and the water was heated to 95° C. under the atmosphere of nitrogen. Then, a mixture containing 314.4 parts of acrylic acid, 45.6 parts of sodium acrylate, and 360 parts of water, a mixture containing 11.1 parts of ammonium persulfate and 99.6 parts of water, and a mixture containing 50.5 parts of sodium hydrogen sulfite and 117.7 parts of water were added to the contents of the reaction vessel over a period of 240 minutes. After completion of this addition, the reaction system was kept at 95° C. for 60 minutes to complete the polymerization reaction. The number average molecular weight of the carboxyl group-containing polymer thus obtained was found to be 5,600.

Then, the polymerization reaction product was cooled to 40° C. and 166.7 parts of ethylene imine was added thereto over a period of 1 hour. After completion of this addition, the reaction system was heated to 90° C. and held at this temperature for 120 minutes to complete the addition reaction. Consequently, there was obtained an aqueous solution of an aminoethylated polymer (2). This polymer (2) was tested for properties in the same manner as in Referential Example 1. The results are shown in Table 1.

Referential Example 3

In the same reaction vessel as used in Referential Example 1, 2611.4 parts of water was stirred and the air entrapped therein was displaced with nitrogen and the water was heated to 95° C. under the atmosphere of nitrogen. Then, a mixture containing 400 parts of acrylic acid and 600 parts of water and a mixture containing 19.4 parts of ammonium persulfate and 369.2 parts of water were added to the contents of the reaction vessel over a period of 120 minutes. After completion of this addition, the reaction system was kept at 95°

C. for 60 minutes to complete the polymerization reaction. The carboxyl group-containing polymer consequently obtained was found to have a number average molecular weight of 9,100.

Then, the polymerization reaction product was cooled to 40° C. and 190.9 parts of ethylene imine was added thereto over a period of 1 hour. After completion of this addition, the reaction system was heated to 90° C. and held at this temperature for 120 minutes to complete the addition reaction, to obtain an aqueous solution of an aminoethylated polymer (3). The polymer was tested for properties in the same manner as in Referential Example 1. The results are shown in Table 1.

Referential Example 4

In the same reaction vessel as used in Referential Example 1, 837.6 parts of water was stirred and the air entrapped in the reaction vessel was displaced with nitrogen and the water was heated to 95° C. under the atmosphere of nitrogen. Then, a mixture containing 360 parts of acrylic acid and 360 parts of water and a mixture containing 15.0 parts of ammonium persulfate and 227.4 parts of water were added to the contents of the reaction vessel over a period of 120 minutes. After completion of this addition, the reaction system was kept at 95° C. for 60 minutes to complete the polymerization reaction. The carboxyl group-containing polymer thus obtained was found to have a number average molecular weight of 11,000.

Then, the polymerization reaction product was cooled to 30° C., combined with 429.8 parts of water, and heated to 40° C. To the diluted product of the polymerization reaction, 107.4 parts of ethylene imine was added over a period of 1 hour. After completion of this addition, the reaction system was heated to 90° C. and held at this temperature for 120 minutes to complete the addition reaction, to obtain an aqueous solution of aminoethylated polymer (4). This polymer (4) was tested for properties in the same manner as in Referential Example 1. The results are shown in Table 1.

Referential Example 5

In the same reaction vessel as used in Referential Example 1, 200 parts of the same aqueous solution of carboxyl group-containing polymer (product of polymerization reaction) as prepared in Referential Example 1 was heated to 40° C. To the aqueous solution, 70.6 parts of ethylene imine was added over a period of 1 hour. After completion of this addition, the reaction system was heated to 90° C. and held at this temperature for 240 minutes to complete the addition reaction. Consequently, there was obtained an aqueous solution of an aminoethylated polymer (5). This polymer (5) was tested for properties in the same manner as in Referential Example 1. The results are shown in Table 1.

Referential Example 6

In the same reaction vessel as used in Referential Example 1, 145 parts of the same aqueous solution of carboxyl group-containing polymer (product of polymerization reaction) as prepared in Referential Example 2 and 537.2 parts of water were heated to 40° C. To the aqueous solution, 134.3 parts of ethylene imine was added over a period of 1 hour. After completion of this addition, the reaction system was heated to 90° C. and held at this temperature for 240 minutes to complete the addition reaction. Consequently, there was obtained an aqueous solution of an aminoethylated polymer (6). This polymer (6) was tested for properties in the same manner as in Referential Example 1. The results are shown in Table 1.

Referential Example 7

In the same reaction vessel as used in Referential Example 1, 250 parts of the same aqueous solution of carboxyl group-containing polymer (product of polymerization reaction) as prepared in Referential Example 3 and 352.2 parts of water were heated to 40° C. To the resultant aqueous solution, 119.3 parts of ethylene imine was added over a period of 1 hour. After completion of this addition, the reaction system was heated to 90° C. and held at this temperature for 240 minutes to complete the addition reaction and obtain an aqueous solution of an aminoethylated polymer (7). This polymer (7) was tested for properties in the same manner as in Referential Example 1. The results are shown in Table 1.

Referential Example 8

In the same reaction vessel as used in Referential Example 1, 408.5 parts of the same aqueous solution of carboxyl group-containing polymer (product of polymerization reaction) as prepared in Referential Example 4 and 156 parts of water were heated to 40° C. To the resultant diluted solution, 39.0 parts of ethylene imine was added over a period of 1 hour. After completion of this addition, the reaction system was heated to 90° C. and held at this temperature for 240 minutes to complete the addition reaction and obtain an aqueous solution of an aminoethylated polymer (8). This polymer (8) was tested for properties in the same manner as in Referential Example 1. The results are shown in Table 1.

Referential Example 9

In the same reaction vessel as used in Referential Example 1, 278.6 parts of water was stirred, the air entrapped in the reaction vessel was displaced with nitrogen, and the water was heated to 95° C. under the atmosphere of nitrogen. Then, a mixture containing 160 parts of methacrylic acid and 240 parts of water and a mixture containing 12.1 parts of ammonium persulfate and 68.8 parts of water were added to the contents of the reaction vessel over a period of 120 minutes. Then, a mixture containing 6.1 parts of ammonium persulfate and 34.4 parts of water was added thereto over a period of 60 minutes. After completion of this addition, the reaction system was heated to 95° C. and held at this temperature for a period of 60 minutes to complete the polymerization reaction. The carboxyl group-containing polymer thus obtained was found to have a number average molecular weight of 7,000.

Then, the product of the polymerization was cooled to 30° C., combined with 255.6 parts of water, and heated to 40° C. To the resultant solution, 63.9 parts of ethylene imine was added over a period of 1 hour. After completion of this addition, the reaction system was heated to 90° C. and held at this temperature for 120 minutes to complete the addition reaction and obtained an aqueous solution of an aminoethylated polymer (9). This polymer (9) was tested for properties in the same manner as in Referential Example 1. The results are shown in Table 1.

Referential Example 10

In the same reaction vessel as used in Referential Example 1, 837.6 parts of water was stirred, the air entrapped in the reaction vessel was displaced with nitrogen, and the water was heated to 80° C. under the atmosphere of nitrogen. Then, a mixture containing 450 parts of acrylic acid and 300 parts of water and a mixture containing 18.7 parts of ammonium persulfate and 193.7 parts of water were added to the contents of the reaction vessel over a period of 60 minutes. After completion of this addition, the reaction system was kept at 80° C. for 60 minutes to complete the polymerization reaction. The carboxyl group-containing polymer consequently obtained was found to have a number average molecular weight of 80,000.

Then, the polymerization reaction product was cooled to 30° C., combined with 316 parts of water, and heated to 40° C. To the resultant solution, 134 parts of ethylene imine was added over a period of 1 hour. After completion of this addition, the reaction system was heated to 90° C. and held at this temperature for 120 minutes to complete the addition reaction and obtain an aqueous solution of an aminoethylated polymer (10). The polymer (10) was tested for properties in the same manner as in Referential Example 1. The results are shown in Table 1.

Referential Example 11

In the same reaction vessel as used in Referential Example 1, 837.6 parts of water was stirred, the air entrapped in the reaction vessel was displaced with nitrogen, and the water was heated to 80° C. under the atmosphere of nitrogen. Then, a mixture containing 450 parts of acrylic acid and 450 parts of water and a mixture containing 3.12 parts of ammonium persulfate and 59.3 parts of water were added to the contents of the reaction vessel over a period of 60 minutes. After completion of this addition, the reaction system was kept at 80° C. for 60 minutes to complete the polymerization. The carboxyl group-containing polymer consequently obtained was found to have a number average molecular weight of 350,000.

Then, the polymerization reaction product was cooled to 30° C., combined with 316 parts of water, and heated to 40° C. To the resultant solution, 134 parts of ethylene imine was added over a period of 1 hour. After completion of this addition, the reaction system was heated to 90° C. and held at this temperature for 120 minutes to complete the addition reaction and obtain an aqueous solution of an aminoethylated polymer (11). This polymer (11) was tested for properties in the same manner as in Referential Example 1. The results are shown in Table 1.

Referential Example 12

An aqueous solution of an aminoethylated polymer (12) was obtained by adding 1.2 parts of an aqueous 48% sodium hydroxide solution to the same aqueous solution of aminoethylated polymer (3) as obtained in Referential Example 3 and adjusting the resultant mixture to pH 7.

Referential Example 13

In the same reaction vessel as used in Referential Example 1, 400 parts of water was stirred, the air entrapped in the reaction vessel was displaced with nitrogen, and the water was heated to 95° C. under the atmosphere of nitrogen. Then, a mixture containing 174.2 parts of acrylic acid, 56.1 parts of 2-hydroxyacrylate, and 411.1 parts of water was added over a period of 120 minutes and a mixture containing 10.14 parts of ammonium persulfate and 100.0 parts of water was added over a period of 140 minutes respectively to the contents of the reaction vessel. After completion of this addition, the reaction system was kept at 95° C. for 60 minutes to complete the polymerization reaction. The carboxyl group-containing polymer thus obtained was found to have a number average molecular weight of 62,000.

Then, the polymerization reaction product was cooled to 40° C. and 52.0 parts of ethylene imine was added thereto over a period of 1 hour. After completion of this addition, the reaction system was heated to 90° C. and held at this temperature for 120 minutes to complete the addition reaction and obtain an aqueous solution of an aminoethylated polymer (13). This polymer (13) was tested for properties in the same manner as in Referential Example 1. The results are shown in Table 1.

Referential Example 14

In the same reaction vessel as used in Referential Example 1, 760 parts of water was stirred, the air entrapped in the reaction vessel was displaced with nitrogen, and the water was heated to 95° C. under the atmosphere of nitrogen. Then, a mixture containing 156.6 parts of acrylic acid, 156.8 parts of sodium-2-methacryloyloxy ethylsulfonate, and 383.5 parts of water was added over a period of 120 minutes and a mixture containing 10.14 parts of ammonium persulfate and 100.0 parts of water was added over a period of 140 minutes respectively to the contents of the reaction vessel. After completion of this addition, the reaction system was kept at 95° C. for 60 minutes to complete the polymerization reaction. The carboxyl group-containing polymer thus obtained was found to have a number average molecular weight of 49,000.

Then, the polymerization reaction product was cooled to 40° C. and 46.7 parts of ethylene imine was added thereto over a period of 1 hour. After completion of this addition, the reaction system was heated to 90° C. and held at this temperature for 120 minutes to complete the addition reaction and obtain an aqueous solution of an aminoethylated polymer (14). This polymer (14) was tested for properties in the same manner as in Referential Example 1. The results are shown in Table 1.

Referential Example 15

In the same reaction vessel as used in Referential Example 1, 600 parts of water was stirred, the air entrapped in the reaction vessel was displaced with nitrogen, and the water was heated to 95° C. under the atmosphere of nitrogen. Then, a mixture containing 174.2 parts of acrylic acid, 99.7 parts of 2-acrylamide-2-methyl propanesulfonic acid, and 386.0 parts of water was added over a period 120 minutes and a mixture containing 10.14 parts of ammonium persulfate and 100.0 parts of water was added over a period of 140 minutes respectively to the contents of the reaction vessel. After completion of this addition, the reaction system was kept at 95° C. for 60 minutes to complete the polymerization reaction. The carboxyl group-containing polymer consequently obtained was found to have a number average molecular weight of 20,000.

Then, the polymerization reaction product was cooled to 40° C. and 52.0 parts of ethylene imine was added thereto over a period of 1 hour. After completion of this addition, the reaction system was heated to 90° C. and held at this temperature for 120 minutes to complete the addition reaction and obtain an aqueous solution of an aminoethylated polymer (15). This polymer (15) was tested for properties in the same manner as in Referential Example 1. The results are shown in Table 1.

Referential Example 16

In the same reaction vessel as used in Referential Example 1, 700 parts of an aqueous solution of the same aminoethylated polymer (3) as obtained in Referential Example 3 was stirred, the air entrapped in the reaction vessel was displaced with nitrogen, and the aqueous solution was heated to 50° C. under the atmosphere of nitrogen. In the meantime, 16.3 parts of gaseous ethylene oxide supplied from an ethylene oxide cylinder mounted on a balance was introduced through the gas inlet tube and bubbled through the aqueous solution of the polymer (3) to effect addition reaction. The bubbling required 60 minutes for its completion. Thereafter, the reaction system was kept at 50° C. for four hours to complete the reaction. Consequently, there was obtained an aqueous solution of an alkylene oxide-added aminoethylated polymer (16). The polymer (16) was tested for properties in the same manner as in Referential Example 1. The results are shown in Table 1.

Referential Example 17

In the same reaction vessel as used in Referential Example 1, 200 parts of the same aqueous solution of carboxyl group-containing polymer (polymerization reaction product) as obtained in the same manner as in Referential Example 1 was heated to 40° C. To the aqueous solution, 14.91 parts of propylene imine was added over a period of 1 hour. After completion of this addition, the reaction system was heated to 90° C. and held at this temperature for 180 minutes to complete the addition reaction and obtain an aqueous solution of an aminopropylated polymer (17).

Referential Example 18

In an autoclave made of steel and provided with a stirrer, a thermometer, a pressure gauge, and two gas inlet tubes, 89 parts of maleic anhydride, 15.0 parts of benzoyl peroxide, and 875 parts of dichloroethane were kept stirred and the air entrapped in the reaction vessel was thoroughly displaced with ethylene by subjecting the interior of the autoclave to alternate application and removal of ethylene pressure of 10 kg/cm² several times. The contents of the autoclave were kept under pressure of 20 to 30 kg/cm² by the added ethylene and, at the same time, held at 70° C. for 10 hours to effect polymerization reaction. The reaction product could be easily separated by filtration. The separated product was vacuum dried to obtain 95.1 parts of a carboxyl group-containing polymer (18).

The carboxyl group-containing polymer (18) thus obtained was analyzed by the titration with an aqueous sodium hydroxide solution. Consequently, the composition ratio of maleic anhydride to ethylene in the polymer, maleic anhydride: ethylene (molar ratio), was found to be 29:71. By the high-speed liquid chromatography, the carboxyl group-containing polymer (18) was found to have a number average molecular weight of 21,000.

Then, in a reaction vessel made of glass and provided with a thermometer, a stirrer, a dropping funnel, a gas inlet tube, and a reflux condenser, 95.1 parts of the carboxyl group-containing polymer (18) and 403.2 parts of water were kept stirred, the air entrapped in the reaction vessel was displaced with nitrogen, and the stirred mixture was heated at 80° C. for 2 hours under the atmosphere of nitrogen, to produce an aqueous solution of the carboxyl group-containing polymer (18). Then, the aqueous solution was kept cooled at 40° C. and 39.3 parts of ethylene imine was added thereto over a period of 1 hour. After completion of this addition, the reaction system was heated to 90° C. and held at this temperature for 120 minutes to complete the addition reaction and obtain an aqueous solution of an aminoethylated polymer (18).

This aminoethylated polymer (18) was tested for properties in the same manner as in Referential Example 1. The results are shown in Table 1.

Referential Example 19

In the same autoclave as used in Referential Example 18, 89 parts of maleic anhydride, 7.5 parts of benzoyl peroxide, and 875 parts of dichloroethane were kept stirred and the air entrapped in the autoclave was thoroughly displaced with ethylene by subjecting the interior of the autoclave to alternate application and removal of ethylene pressure of 10 kg/cm² several times. Then, the contents of the autoclave were kept at 70° C. under a pressure of 20 to 30 kg/cm² by the added ethylene for 10 hours to effect reaction. The product of the reaction could be easily separated by filtration. By vacuum drying the separated product, there was obtained 102.6 parts of a carboxyl group-containing polymer (19).

The carboxyl group-containing polymer (19) was analyzed for contents of maleic anhydride and ethylene. Consequently, the molar ratio of maleic anhydride to ethylene, maleic anhydride:ethylene, was found to be 30.2:69.8.

By the high-speed liquid chromatography, the carboxyl group-containing polymer (19) was found to have a number average molecular weight of 45,000.

Then, in the same glass reaction vessel as used in Referential Example 18, 102.6 parts of the carboxyl group-containing polymer (19) and 438 parts of water were kept stirred, the air entrapped in the reaction vessel was displaced with nitrogen, and the stirred mixture was heated to 80° C. for 2 hours under the atmosphere of nitrogen, to obtain an aqueous solution of the carboxyl group-containing polymer (19). Then, this aqueous solution was cooled to 40° C. and 43.4 parts of ethylene imine was added thereto over a period of 1 hour. After completion of this addition, the reaction system was heated to 90° C. and held at this temperature for 120 minutes to complete the addition reaction to obtain an aqueous solution of an aminoethylated polymer (19).

This aminoethylated polymer (19) was tested for properties in the same manner as in Referential Example 1. The results are shown in Table 1.

Referential Example 20

In the same autoclave as used in Referential Example 18, 89 parts of maleic anhydride, 2.5 parts of benzoyl peroxide, and 875 parts of dichloroethane were kept stirred and the air entrapped in the autoclave was thoroughly displaced with ethylene by subjecting the interior of the autoclave to alternate application and removal of ethylene pressure of 10 kg/cm² several times. The contents of the autoclave were kept at 70° C. under pressure of 20 to 30 kg/cm² by the added ethylene for 10 hours to effect reaction. The reaction product was vacuum dried, to obtain 110.5 parts of a carboxyl group-containing polymer (20).

The carboxyl group-containing polymer (20) obtained as described above was analyzed for contents of maleic anhydride and ethylene. Consequently, the molar ratio of maleic anhydride to ethylene, maleic anhydride:ethylene, was found to be 41:59.

By the high-speed liquid chromatography, the carboxyl group-containing polymer (20) was found to have a number average molecular weight of 96,000.

Then, in the glass reaction vessel, 110.5 parts of the carboxyl group-containing polymer (20) and 496.5 parts of water were kept stirred, the air entrapped in the reaction vessel was displaced with nitrogen, and the stirred mixture was heated at 80° C. for 2 hours, to obtain an aqueous solution of the carboxyl group-containing polymer (20). Then, this aqueous solution was kept cooled to 40° C. and 55.0 parts of ethylene imine was added thereto over a period of 1 hour. After completion of this addition, the reaction system was heated to 90° C. and held at this temperature for 120 minutes to complete the addition reaction and obtain an aqueous solution of an aminoethylated polymer (20). This aminoethylated polymer (20) was tested for properties in the same manner as in Referential Example 1. The results are shown in Table 1.

Referential Example 21

In the same autoclave as used in Referential Example 18, 89 parts of maleic anhydride, 0.5 part of benzoyl peroxide, and 875 parts of dichloroethane were kept stirred and the air entrapped in the autoclave was thoroughly displaced with ethylene by subjecting the interior of the autoclave to alternate application and removal of ethylene pressure of 10 kg/cm$^2$ several times. The contents of the autoclave were held at 70° C. under pressure of 20 to 30 kg/cm$^2$ by the added ethylene for 10 hours to effect reaction. The reaction product could be easily separated by filtration. This separated product was vacuum dried, to obtain 128.1 parts of a carboxyl group-containing polymer (21).

The carboxyl group-containing polymer was analyzed for contents of maleic anhydride and ethylene. Consequently, the molar ratio of maleic anhydride to ethylene, maleic anhydride:ethylene, was found to be 49:51.

By the high-speed liquid chromatography, the carboxyl group-containing polymer (21) was found to have a number average molecular weight of 300,000.

Then, in the same glass reaction vessel as used in Referential Example 18, 128.1 parts of the carboxyl group-containing polymer (21) and 592.5 parts of water were kept stirred, the air entrapped in the reaction vessel was thoroughly displaced with nitrogen, and the stirred mixture was heated at 80° C. for 2 hours, to obtain an aqueous solution of the carboxyl group-containing polymer (21). Then, this aqueous solution was kept cooled to 40° C. and 69.4 parts of ethylene imine was added thereto over a period of 1 hour. After completion of this addition, the reaction system was heated to 90° C. and held at this temperature for 120 minutes to complete the addition reaction to obtain an aqueous solution of aminoethylated polymer (21). This aminoethylated polymer (21) was tested for properties in the same manner as in Referential Example 1. The results are shown in Table 1.

Referential Example 22

In the same glass reaction vessel as used in Referential Example 18, 45.0 parts of the same carboxyl group-containing polymer (18) as prepared in Referential Example 18 and 728.1 parts of water were kept stirred, the air entrapped in the mixture was heated at 80° C. for 2 hours under the atmosphere of nitrogen. Then, the reaction system was kept cooled at 40° C. and 197.7 parts of ethylene imine was added thereto over a period of 1 hour. After completion of this addition, the reaction system was heated to 90° C. and held at this temperature for 120 minutes to complete the addition reaction and obtain an aqueous solution of an aminoethylated polymer (22). This aminoethylated polymer (22) was tested for properties in the same manner as in Referential Example 1. The results are shown in Table 1.

Referential Example 23

In the same glass reaction vessel as used in Referential Example 18, 127.2 parts of the same carboxyl group-containing polymer (21) as prepared in the same manner as in Referential Example 21 and 459 parts of water were kept stirred, the air entrapped in the reaction vessel was displaced with nitrogen, and the stirred mixture was heated at 80° C. for 2 hours under the atmosphere of nitrogen. Then, the reaction system was kept cooled at 40° C. and 25.8 parts of ethylene imine was added thereto over a period of 1 hour. After completion of this addition, the reaction system was heated to 90° C. and held at this temperature for 120 minutes to complete the addition reaction and obtain an aqueous solution of an aminoethylated polymer (23). This aminoethylated polymer (23) was tested for properties in the same manner as in Referential Example 1. The results are shown in Table 1.

Referential Example 24

In the same glass reaction vessel as used in Referential Example 18, 136.3 parts of maleic anhydride and 221.3 parts of methylethyl ketone were kept stirred, the air entrapped in the reaction vessel was displaced with nitrogen, and the stirred mixture was heated to 92° C. under the atmosphere of nitrogen. Then, a mixture containing 144.9 parts of styrene and 144.9 parts of methylethyl ketone and a mixture containing 13.9 parts of benzoyl peroxide and 55.6 parts of methylethyl ketone were added over a period of 120 minutes to the contents of the reaction vessel. After completion of this addition, the reaction system was kept at 92° C. for 60 minutes to complete the polymerization reaction. By subjecting the product of this reaction to evaporation, there was obtained 280.7 parts of a carboxyl group-containing polymer (22).

The carboxyl group-containing polymer (22) consequently obtained was found to have a number average molecular weight of 35,000.

Then, in the same reaction vessel as used in the reaction described above, 280.7 parts of the carboxyl group-containing polymer (22) and 1076 parts of water were kept stirred, the air entrapped in the reaction vessel was displaced with nitrogen, and the stirred mixture was kept heated at 40° C. and 78.0 parts of ethylene imine was added thereto over a period of 1 hour. After completion of this addition, the reaction system was heated to 90° C. and held at this temperature for 120 minutes to complete the addition reaction and obtain an aqueous solution of an aminoethylated polymer (24). This aminoethylated polymer (24) was tested for properties in the same manner as in Referential Example 1. The results are shown in Table 1.

Referential Example 25

In the same glass reaction vessel as used in Referential Example 18, 282.5 parts of the same carboxyl group-containing polymer (22) as prepared in Referential Example 24 and 1083 parts of water were kept stirred, the air entrapped in the reaction vessel was displaced with nitrogen, and the stirred mixture was heated to 80° C. for 2 hours under the atmosphere of nitrogen. Then, the reaction system was kept cooled at 40° C. and 29.4 parts of ethylene imine was added thereto over a period of 1 hour. After completion of this addition, the reaction system was heated to 90° C. and held at this temperature for 120 minutes to complete the addition reaction and obtain an aqueous solution an aminoethylated polymer (25). The aminoethylated polymer (25) was tested for properties in the same manner as in Referential Example 1. The results are shown in Table 1.

Referential Example 26

In the same glass reaction vessel as used in Referential Example 18, 317.3 parts of polyethylene glycol monoallyl ether (containing an average of 5 ethylene oxide units per molecule) and 88.5 parts of water were kept stirred, the air entrapped in the reaction vessel was displaced with nitrogen, and the stirred mixture was heated to 95° C. under the atmosphere of nitrogen. Then, a mixture containing 139.3 parts of maleic anhydride, 11.1 parts of ammonium persulfate, and 209 parts of water was added over a period of 120 minutes and subsequently a mixture containing 27.8 parts of ammonium persulfate and 111.2 parts of water was added over a period of 60 minutes, respectively to the contents of the reaction vessel. After completion of this addition, the reaction system was kept at 95° C. for 90 minutes to complete the polymerization reaction and obtain an aqueous solution of a carboxyl group-containing polymer (23). The carboxyl group-containing polymer (23) thus obtained was found to have a molecular weight of 3,000.

Then, the product of the polymerization reaction was kept cooled to 40° C. and 76.5 parts of ethylene imine was added thereto over a period of 1 hour. After completion of this addition, the reaction system was heated to 90° C. and held at this temperature for 120 minutes to complete the addition reaction and obtain an aqueous solution of an aminoethylated polymer (26). This aminoethylated polymer (26) was tested for properties in the same manner as in Referential Example 1. The results are shown in Table 1.

Referential Example 27

In the same glass reaction vessel as used in Referential Example 18, 904.2 parts of an aqueous solution of the same carboxyl group-containing polymer (23) as prepared in Referential Example 26 was kept stirred, the air entrapped in the reaction vessel was displaced with nitrogen, and the stirred aqueous solution was kept at 80° C. for 2 hours under the atmosphere of nitrogen. Then, the reaction system was kept cooled at 40° C. and 28.7 parts of ethylene imine was added thereto over a period of 1 hour. After completion of this addition, the reaction system was heated to 90° C. and held at this temperature for 120 minutes to complete the addition reaction and obtain an aqueous solution of an aminoethylated polymer (27). This aminoethylated polymer (27) was tested for properties in the same manner as in Referential Example 1. The results are shown in Table 1.

Referential Example 28

In the same glass reaction vessel as used in Referential Example 18, 400 parts of an aqueous solution of the same aminoethylated polymer (18) as prepared in Referential Example 18 was kept stirred, the air entrapped in the reaction vessel was displaced with nitrogen, and the stirred aqueous solution was heated to 50° C. under the atomosphere of nitrogen. In the meantime, 15.0 parts of gaseous ethylene oxide supplied from an ethylene oxide cylinder mounted on a balance was introduced through the gas inlet tube and bubbled through the aqueous solution of the aminoethylated polymer (18) to effect addition reaction. The bubbling required 60 minutes for its completion. Then, the reaction system was kept at 50° C. for 4 hours to complete the reaction and obtain an aqueous solution of an ethylene oxide-added aminoethylated polymer (28). This aminoethylated polymer (28) was tested for properties in the same manner as in Referential Example 1. The results are shown in Table 1.

Referential Example 29

In the same glass reaction vessel as used in Referential Example 18, 136.3 parts of maleic anhydride and 228.5 parts of methylethyl ketone were stirred, the air entrapped in the reaction vessel was displaced with nitrogen, and the stirred mixture was heated to 92° C. Then, a mixture containing 119.7 parts of vinyl acetate and 119.7 parts of methylethyl ketone and a mixture containing 13.9 parts of benzoyl peroxide and 55.6 parts of methylethyl ketone were added to the contents of the reaction vessel over a period of 120 minutes. After completion of this addition, the reaction system was kept at 92° C. for 60 minutes to complete the polymerization reaction. By subjecting this reaction product to evaporation, there was obtained 253.1 parts of a carboxyl group-containing polymer (24). The carboxyl group-containing polymer (24) thus obtained was found to have a number average molecular weight of 26,000.

Then, in the same reaction vessel as used in the reaction described above, 253.1 parts of the carboxyl group-containing polymer (24) and 1050 parts of water were stirred, the air entrapped in the reaction vessel was displaced with nitrogen, and the stirred aqueous solution was kept heated at 40° C., and 96.9 parts of ethylene imine was added thereto over a period of 1 hour. After completion of this addition, the reaction system was heated to 90° C. and held at this temperature for 120 minutes to complete the addition reaction and obtain an aqueous solution of an aminoethylated polymer (29). This aminoethylated polymer (29) was tested for properties in the same manner as in Referential Example 1. The results are shown in Table 1.

Referential Example 30

In a reaction vessel made of glass and provided with a thermometer, a stirrer, a gas inlet tube, and a reflux condenser, 37.7 parts of dodecene, 5.90 parts of maleic anhydride, and 0.40 part of benzoyl peroxide were kept stirred, the air entrapped in the reaction vessel was displaced with nitrogen, and the stirred mixture was heated to 100° C. under the atmosphere of nitrogen and held at this temperature for 4 hours to complete the polymerization reaction. The carboxyl group-containing polymer thus obtained was found to have a number average molecular weight of 17,000.

Then, the reaction product was cooled to 30° C., combined with 143.3 parts of water, and heated to 40° C. To the diluted reaction product, 4.15 parts of ethylene imine was added over a period of 1 hour. After completion of this addition, the reaction system was heated to 90° C. and held at this temperature for 120 minutes to complete the addition reaction and obtain an aqueous solution of an aminoethylated polymer (30). This aminoethylated polymer (30) was tested for properties in the same manner as in Referential Example 1. The results are shown in Table 1.

Referential Example 31

In the same glass reaction vessel as used in Referential Example 18, 95.1 parts of an aqueous solution of the same carboxyl group-containing polymer (18) as prepared in Referential Example 18 and 441.3 parts of water were kept stirred, the air entrapped in the reaction vessel was displaced with nitrogen, and the stirred aqueous solution was heated at 80° C. for 2 hours under the atmosphere of nitrogen and cooled to 40° C. The reaction system was kept at 40° C. and 52.0 parts of propylene imine was added thereto over a period of 1 hours. After completion of this addition, the reaction system was heated to 90° C. and held at this temperature for 180 minutes to complete the addition reaction and obtain an aqueous solution of an aminopropylated polymer (31). This aminopropylated polymer (31) was tested for properties in the same manner as in Referential Example 1. The results are shown in Table 1.

Referential Example 32

In the same glass reaction vessel as used in Referential Example 18, 95.1 parts of the same carboxyl group-containing polymer (18) as prepared in Referential Example 18 and 403.2 parts of water were kept stirred, the air entrapped in the reaction vessel was displaced with nitrogen, and the stirred aqueous solution was kept heated at 80° C. for 2 hours, to obtain an aqueous solution of a carboxyl group-containing polymer (18). Then, this aqueous solution was kept cooled at 40° C., 15.4 parts of gaseous ethylene oxide supplied from an ethylene oxide cylinder mounted on a balance was introduced therein through the gas inlet tube, and 39.3 parts of ethylene imine was added at the same time through the dropping funnel over a period of 1 hour. After completion of this addition, the reaction system was heated to 50° C. and held at this temperature for 120 hours and further heated to 90° C. and held at this temperature for 120 minutes to complete the reaction and obtain an aqueous solution of an ethylene oxide-added aminoethylated polymer (32). This aminoethylated polymer was tested for properties in the same manner as in Referential Example 1. The results are shown in Table 1

Comparative Referential Example 1

In the same reaction vessel as used in Referential Example 1, 10 parts of an aqueous solution of the same carboxyl group-containing polymer as prepared in Referential Example 1 (polymerization product) and 400 parts of water were heated to 40° C. To the aqueous solution, 97.9 parts of ethylene imine was added over a period of 4 hours. After completion of this addition, the reaction system was heated to 90° C. and held at this temperature for 8 hours to complete the addition reaction and obtain an aqueous solution of an aminoethylated polymer (1) for comparison. This polymer (1) for comparison was tested for properties in the same manner as in Referential Example 1. The results are shown in Table 1.

Comparative Referential Example 2

In the same reaction vessel as used in Referential Example 1, 200 parts of an aqueous solution of the same carboxyl group-containing polymer as prepared in Referential Example 1 (polymerization reaction product) was heated to 40° C. To the aqueous solution, 1.12 parts of ethylene imine was added over a period 1 hour. After completion of this addition, the reaction system was heated to 90° C. and held at this temperature for 120 minutes to complete the addition reaction and obtain an aqueous solution of an aminoethylated polymer (2) for comparison.

Comparative Referential Example 3

In the same glass reaction vessel as used in Referential Example 18, 5.0 parts of the same carboxyl group-containing polymer (18) as prepared in Referential Example 18 and 712.8 parts of water were heated to 40° C. To the resultant aqueous solution, 232.6 parts of ethylene imine was added over a period of 4 hours. After completion of this addition, the reaction system was heated to 90° C. and held at this temperature for 8 hours to complete the addition reaction and obtain an aqueous solution of an aminoethylated polymer (3) for comparison. This aminoethylated polymer (3) for comparison was tested for properties in the same manner as in Referential Example 1. The results are shown in Table 1.

Comparative Referential Example 4

In the same glass reaction vessel as used in Referential Example 18, 96.7 parts of the same carboxyl group-containing polymer (18) as prepared in Referential Example 18 and 297.6 parts of water were heated to 40° C. To the resultant aqueous solution, 2.50 parts of ethylene imine was added over a period of 1 hour. After completion of this addition, the reaction system was heated to 90° C. and held at this temperature for 120 minutes to complete the addition reaction and obtain an aqueous solution of an aminoethylated polymer (4) for comparison. This aminoethylated polymer (4) for comparison was tested for properties in the same manner as in Referential Example 1. The results are shown in Table 1.

TABLE 1

|  | Aminoalkylated polymer obtained | Number of mol of alkylene imine reacted per mol of carboxyl group in aminoalkylated polymer obtained | Viscosity of aqueous solution (CPS) of aminoalkylated polymer obtained (measured with B type viscosimeter at 25° C.) |
| --- | --- | --- | --- |
| Referential Example 1 | Aminoethylated polymer (1) | 0.8 | 7.0 |
| Referential Example 2 | Aminoethylated polymer (2) | 0.8 | 8.3 |
| Referential Example 3 | Aminoethylated polymer (3) | 0.8 | 9.2 |

TABLE 1-continued

| | Aminoalkylated polymer obtained | Number of mol of alkylene imine reacted per mol of carboxyl group in aminoalkylated polymer obtained | Viscosity of aqueous solution (CPS) of aminoalkylated polymer obtained (measured with B type viscosimeter at 25° C.) |
| --- | --- | --- | --- |
| Referential Example 4 | Aminoethylated polymer (4) | 0.5 | 18.2 |
| Referential Example 5 | Aminoethylated polymer (5) | 3.1 | 7.1 |
| Referential Example 6 | Aminoethylated polymer (6) | 8.0 | 19.1 |
| Referential Example 7 | Aminoethylated polymer (7) | 8.0 | 23.1 |
| Referential Example 8 | Aminoethylated polymer (8) | 0.8 | 19.6 |
| Referential Example 9 | Aminoethylated polymer (9) | 0.8 | 14.1 |
| Referential Example 10 | Aminoethylated polymer (10) | 0.5 | 980 |
| Referential Example 11 | Aminoethylated polymer (11) | 0.5 | 16,000 |
| Referential Example 13 | Aminoethylated polymer (13) | 0.5 | 450 |
| Referential Example 14 | Aminoethylated polymer (14) | 0.5 | 170 |
| Referential Example 15 | Aminoethylated polymer (15) | 0.5 | 35.0 |
| Referential Example 16 | Aminoethylated polymer (16) | 0.8 | 20.7 |
| Referential Example 17 | Aminopropylated polymer (17) | 0.5 | 7.0 |
| Referential Example 18 | Aminoethylated polymer (18) | 0.8 | 43.5 |
| Referential Example 19 | Aminoethylated polymer (19) | 0.8 | 120 |
| Referential Example 20 | Aminoethylated polymer (20) | 0.8 | 800 |
| Referential Example 21 | Aminoethylated polymer (21) | 0.8 | 22,000 |
| Referential Example 22 | Aminoethylated polymer (22) | 3.1 | 750 |
| Referential Example 23 | Aminoethylated polymer (23) | 8.0 | 12,000 |
| Referential Example 24 | Aminoethylated polymer (24) | 8.0 | 98.0 |
| Referential Example 25 | Aminoethylated polymer (25) | 0.8 | 85.0 |
| Referential Example 26 | Aminoethylated polymer (26) | 0.8 | 12.0 |
| Referential Example 27 | Aminoethylated polymer (27) | 0.5 | 8.5 |
| Referential Example 28 | Aminoethylated polymer (28) | 0.5 | 53.2 |
| Referential Example 29 | Aminoethylated polymer (29) | 0.8 | 50.4 |
| Referential Example 30 | Aminoethylated polymer (30) | 0.8 | 25.3 |
| Referential Example 31 | Amino propylated polymer (31) | 0.5 | 48.7 |
| Referential Example 32 | Aminoethylated polymer (32) | 0.8 | 55.0 |
| Comparative referential Example 1 | Aminoethylated polymer (1) for comparison | 87 | 42.9 |
| Comparative referential Example 2 | Aminoethylated polymer (2) for comparison | 0.05 | 6.6 |
| Comparative referential Example 3 | Aminoethylated polymer (3) for comparison | 90 | 89,000 |
| Comparative referential Example 4 | Aminoethylated polymer (4) for comparison | 0.05 | 11.0 |

Example 1

Ordinary portland cement (produced by Sumitomo Cement K.K.) was employed as cement, river sand produced from Yodo River (specific gravity 2.51 and fineness modulus 2.78) as fine aggregate, crushed stone produced from Takatsuki (specific gravity 2.68 and fineness modulus 6.73) as coarse aggregate, and the aminoethylated polymer (1) obtained in Referential Example 1 as cement dispersant. These materials were weighed out, using a unit ratio of 320 kg/m³ for cement, 166 kg/m³ (water/cement ratio 51.9%) for water, 890 kg/m³ for fine aggregate, 941 kg/m³ for coarse aggregate, and 0.35% (relative to cement) for cement dispersant, in respective amounts to make up a total volume of 30 liters and were placed in a tilting mixer. They were immediately kneaded at a rate of 35 r.p.m. for 3 minutes to prepare a fluid concrete having a design slump of 18 cm and a design air content of 4.5% [a minute amount of an air-entraining agent (produced by Yamaso Kagaku K.K. and marketed under trademark designation of "Vinsol") was used where the design air content was not obtained]. The fluid concrete fresh from the kneading treatment was sampled and tested for slump and air content.

After completion of the kneading treatment, the mixing was continued for 60 minutes with the operating rate of the tilting mixer lowered to 3 r.p.m. At the end of the mixing, the concrete was sampled and again tested for slump and air content. The results were examined to find change by aging.

The fluid concrete consequently obtained was further tested for compressive strength and setting time. The results of the test are shown in Table 2.

The methods employed for determination of slump, air content, compressive strength, and setting time and the method for collection of a test piece for compressive strength were invariably in accordance with those defined in Japanese Industrial Standard (JIS) A6204.

Examples 2 to 32

Fluid concretes were prepared by following the procedure of Example 1, except that the aminoalkylated polymers (2) to (32) obtained in Referential Examples 2 to 32 as indicated in Table 2 were used in the respective amounts indicated in Table 2 as cement dispersant. They were tested for slump, air content, compressive strength, and setting time. The results of the test are shown in Table 2.

Control 1

A fluid concrete for comparison was prepared by following the procedure of Example 1, except that commercially available sodium naphthalenesulfonate-formalin condensate was used in a proportion of 0.4% (relative to cement) as cement dispersant in the place of the aminoethylated polymer (1). It was tested for slump, air content, compressive strength, and setting time. The results of the test are shown in Table 2.

Control 2

A fluid concrete for comparison was prepared by following the procedure of Example 1, except that polysodium acrylate (number average molecular weight 11,000) was used in a proportion of 0.3% (relative to cement) as cement dispersant in the place of the aminoethylated polymer (1). It was tested for slump, air content, compressive strength, and setting time. The results of the test are shown in Table 2.

Control 3

A fluid concrete for comparison was prepared by following the procedure of Example 1, except that the aminoethylated polymer (1) for comparison obtained in Comparative Referential Example 1 was used in a proportion of 0.4% (relative to cement) as cement dispersant in the place of the aminoethylated polymer (1). It was tested for slump, air content, compressive strength, and setting time. The results of the test are shown in Table 2.

Control 4

A fluid concrete for comparison was prepared by following the procedure of Example 1, except that the aminoethylated polymer (2) for comparison obtained in Comparative Referential Example 2 was used in a proportion of 0.4% (relative to cement) as cement dispersant in the place of the aminoethylated polymer (1). It was tested for slump, air content, compressive strength, and setting time. The results of the test are shown in Table 2.

Control 5

A fluid concrete for comparison was prepared by following the procedure of Example 1, except that the aminoethylated polymer (3) for comparison obtained in Comparative Referential Example 3 was used in a proportion of 0.42% (relative to cement) as cement dispersant in the place of the aminoethylated polymer (1). It was tested for slump, air content, compressive strength, and setting time. The results of the test are shown in Table 2.

Control 6

A fluid concrete for comparison was prepared by following the procedure of Example 1, except that the aminoethylated polymer (4) for comparison obtained in Comparative Referential Example 4 was used in a proportion of 0.40% (relative to cement) as cement dispersant in the place of the aminoethylated polymer (1). It was tested for slump, air content, compressive strength, and setting time. The results of the test are shown in Table 2.

TABLE 2

| | Cement dispersant | Amount added (% as solids) (relative to cement) | At the end of kneading | | After 60 minutes standing | | Residual ratio of slump (%) (Note 1) | Compressive strength at age of 28 days (kg/cm$^2$) | Setting time (hr; min) Start/end |
|---|---|---|---|---|---|---|---|---|---|
| | | | Slump (cm) | Air content (%) | Slump (cm) | Air content (%) | | | |
| Example 1 | Aminoethylated polymer (1) | 0.35 | 18.0 | 4.0 | 13.5 | 5.0 | 75 | 330 | 5:15/7:25 |
| Example 2 | Aminoethylated polymer (2) | 0.30 | 17.0 | 5.0 | 12.1 | 5.3 | 71 | 335 | 5:25/7:30 |
| Example 3 | Aminoethylated polymer (3) | 0.32 | 18.5 | 4.5 | 14.0 | 4.7 | 76 | 338 | 5:10/7:30 |
| Example 4 | Aminoethylated polymer (4) | 0.36 | 17.0 | 4.1 | 13.2 | 4.2 | 78 | 334 | 5:50/7:50 |
| Example 5 | Aminoethylated polymer (5) | 0.25 | 17.0 | 4.7 | 13.8 | 4.8 | 81 | 331 | 5:00/7:05 |
| Example 6 | Aminoethylated polymer (6) | 0.30 | 19.0 | 5.2 | 15.1 | 4.9 | 79 | 340 | 5:00/6:55 |
| Example 7 | Aminoethylated polymer (7) | 0.20 | 18.0 | 5.4 | 13.7 | 5.2 | 76 | 329 | 5:00/7:05 |
| Example 8 | Aminoethylated polymer (8) | 0.37 | 18.0 | 4.3 | 14.1 | 4.6 | 78 | 335 | 5:10/7:20 |
| Example 9 | Aminoethylated polymer (9) | 0.30 | 18.5 | 4.4 | 14.5 | 4.7 | 78 | 336 | 5:00/7:05 |
| Example 10 | Aminoethylated polymer (10) | 0.30 | 19.1 | 4.2 | 16.0 | 4.3 | 84 | 343 | 5:50/7:45 |
| Example 11 | Aminoethylated polymer (11) | 0.37 | 17.8 | 4.0 | 16.8 | 4.0 | 94 | 328 | 5:55/8:00 |
| Example 12 | Aminoethylated polymer (12) | 0.32 | 18.1 | 4.1 | 14.4 | 4.6 | 80 | 336 | 5:00/7:15 |
| Example 13 | Aminoethylated polymer (13) | 0.24 | 18.9 | 5.1 | 14.0 | 4.9 | 74 | 351 | 5:55/7:50 |
| Example 14 | Aminoethylated polymer (14) | 0.20 | 18.3 | 3.8 | 13.5 | 4.1 | 74 | 320 | 5:40/7:40 |
| Example 15 | Aminoethylated polymer (15) | 0.24 | 17.0 | 4.2 | 14.2 | 4.8 | 75 | 335 | 5:41/7:39 |
| Example 16 | Aminoethylated polymer (16) | 0.18 | 18.7 | 5.3 | 16.5 | 5.1 | 88 | 325 | 5:15/7:35 |
| Example 17 | Aminopropylated polymer (17) | 0.23 | 18.2 | 5.3 | 17.0 | 5.0 | 93 | 323 | 5:23/7:03 |
| Example 18 | Aminoethylated polymer (18) | 0.30 | 18.5 | 4.2 | 17.5 | 4.5 | 95 | 340 | 5:00/7:15 |
| Example 19 | Aminoethylated polymer (19) | 0.32 | 18.0 | 4.0 | 17.5 | 4.2 | 97 | 345 | 5:05/7:00 |
| Example 20 | Aminoethylated polymer (20) | 0.35 | 18.5 | 4.0 | 18.0 | 4.2 | 97 | 350 | 5:15/7:20 |
| Example 21 | Aminoethylated polymer (21) | 0.34 | 18.5 | 4.4 | 18.0 | 4.6 | 97 | 335 | 5:00/7:10 |
| Example 22 | Aminoethylated | 0.30 | 19.0 | 4.6 | 18.0 | 4.4 | 95 | 330 | 5:20/7:10 |

TABLE 2-continued

| | Cement dispersant | | At the end of kneading | | After 60 minutes standing | | Residual ratio of | Compressive strength at age | Setting time |
| | | Amount added (% as solids) (relative to cement) | Slump (cm) | Air content (%) | Slump (cm) | Air content (%) | slump (%) (Note 1) | of 28 days (kg/cm$^2$) | (hr; min) Start/end |
|---|---|---|---|---|---|---|---|---|---|
| | polymer (22) | | | | | | | | |
| Example 23 | Aminoethylated polymer (23) | 0.30 | 18.5 | 4.4 | 17.0 | 4.2 | 92 | 320 | 5:30/7:30 |
| Example 24 | Aminoethylated polymer (24) | 0.28 | 19.0 | 4.8 | 17.0 | 4.6 | 89 | 345 | 5:00/7:10 |
| Example 25 | Aminoethylated polymer (25) | 0.30 | 17.5 | 4.0 | 16.5 | 4.2 | 94 | 310 | 5:15/7:15 |
| Example 26 | Aminoethylated polymer (26) | 0.25 | 19.0 | 4.8 | 18.5 | 4.9 | 97 | 325 | 5:30/7:40 |
| Example 27 | Aminoethylated polymer (27) | 0.28 | 18.0 | 4.5 | 17.0 | 4.6 | 94 | 328 | 5:00/7:40 |
| Example 28 | Aminoethylated polymer (28) | 0.20 | 18.5 | 5.0 | 18.0 | 4.8 | 97 | 315 | 5:05/7:25 |
| Example 29 | Aminoethylated polymer (29) | 0.23 | 17.5 | 4.2 | 16.5 | 4.0 | 94 | 307 | 5:30/7:30 |
| Example 30 | Aminoethylated polymer (30) | 0.38 | 17.0 | 4.5 | 16.5 | 4.3 | 97 | 350 | 5:00/7:10 |
| Example 31 | Aminopropylated polymer (31) | 0.20 | 19.0 | 5.2 | 18.5 | 4.8 | 97 | 330 | 5:30/7:50 |
| Example 32 | Aminoethylated polymer (32) | 0.20 | 18.0 | 4.8 | 16.5 | 4.9 | 92 | 310 | 5:10/7:00 |
| Control 1 | NSF (Note 1) | 0.40 | 18.0 | 4.9 | 7.0 | 4.8 | 39 | 335 | 5:40/7:30 |
| Control 2 | Polysodium acrylate | 0.30 | 15.0 | 3.0 | 5.8 | 3.1 | 39 | 310 | 7:10/9:45 |
| Control 3 | Aminoethylated polymer (1) for comparison | 0.40 | 11.2 | 4.8 | 6.0 | 4.9 | 54 | 330 | 4:50/6:45 |
| Control 4 | Aminoethylated polymer (2) for comparison | 0.40 | 10.5 | 4.1 | 5.8 | 4.8 | 55 | 341 | 7:00/9:30 |
| Control 5 | Aminoethylated polymer (3) for comparison | 0.42 | 12.0 | 4.0 | 5.0 | 4.9 | 42 | 310 | 4:40/6:50 |
| Control 6 | Aminoethylated polymer (4) for comparison | 0.40 | 12.5 | 4.2 | 6.0 | 4.2 | 48 | 300 | 7:00/9:20 |

(Note 1) Residual ratio of slump (%) = $\frac{\text{Slump after 60 minutes' standing}}{\text{Slump at the end of kneading}} \times 100$ (Note 2) NSF: Sodium naphthalenesulfonate-formalin condensate It is plain from the results of Table 2 that the cement dispersants of the present invention manifested a highly desirable ability to prevent slump loss without causing any appreciable delay in setting.

In contrast, the sodium naphthalenesulfonate-formalin condensate of Control 1 showed a very large slump loss. The dispersants of Controls 2 to 6 showed small amounts of slump at the end of the kneading treatment, indicating that they were deficient in ability to disperse cement. Further, the polysodium acrylate of Control 2 and the aminoethylated polymers (2) and (4) for comparison in Controls 4 and 6 showed a notable delay of setting.

What is claimed is:

1. A cement dispersant containing a water-soluble polymer containing at least 10 mol % of structural units represented by the general formula I:

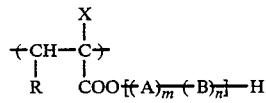

(I)

wherein X is H or CH$^2$R$^1$, R$^1$ is H or COO—[(A)$_m$—(B)$_n$]H, R is H, CH$_3$, or COO[(A)$_m$—(B)$_n$]H (providing that R is H where X is CH$_2$R$^1$), A is iminoalkylene having 2 to 4 carbon atoms, B is oxyalkylene having 2 to 4 carbon atoms, m is an average number in the range of 0.1 to 10, n is 0 or an average positive number not more than 100, (A)$_m$ may be in a linear or branched configuration, wherein the sequence of A and B in the segment in parenthesis may be regular or random said water-soluble polymer being selected from the group consisting of a first additional reaction product obtained by (i) preparing a carboxyl group-containing polymer by polymerizing (a) 10 to 100 mol % of an unsaturated carboxylic acid represented by the formula II;

$$CHR^2=CYCOOH \qquad (II)$$

wherein Y is H or CH$_2$R$^3$, R$^3$ is H or COOH, R$^2$ is H, CH$_3$, or COOH (providing that R$^2$ is H where Y is CH$_2$R$^3$) or an anhydride thereof with (b) 90 to 0 mol % of another monomer copolymerizable with said monomer (a) and reacting (ii) said carboxyl group-containing polymer with an alkylene imine of 2 to 4 carbon atoms in a ratio such that the amount of said alkylene imine falls in the range of 0.1 to 10 mols per mol of the carboxyl group in said carboxyl group-containing polymer and a second addition reaction product obtained by subjecting said first addition reaction product to an addition reaction with an alkylene oxide of 2 to 4 carbon atoms in a ratio such that the amount of said alkylene oxide on the average is not more than 100 mols per mol of said carboxyl group.

2. A cement dispersant according to claim 1, wherein said alkylene imine is ethylene imine.

3. A cement dispersant according to claim 1, wherein said alkylene oxide is ethylene oxide.

4. A cement dispersant according to claim 1, wherein said unsaturated carboxylic acid is a monocarboxylic acid.

5. A cement dispersant according to claim 4, wherein said monocarboxylic acid is acrylic acid or methacrylic acid.

6. A cement dispersant according to claim 1, wherein said carboxyl group-containing polymer is derived by using (a) said unsaturated carboxylic acid or anhydride thereof and (b) said copolymerizable monomer in ratio such that the amount of said unsaturated carboxylic acid or anhydride thereof is in the range of 50 to 100 mol % and that of said copolymerizable monomer in the range of 50 to 0 mol %.

7. A cement dispersant according to claim 1, wherein the addition mol number of said alkylene imine on the average is in the range of 0.4 to 8 mols per mol of said carboxyl group.

8. A cement dispersant according to claim 1, wherein the addition mol number of said alkylene oxide on the average is not more than 20 mols per mol of said carboxyl group.

* * * * *